United States Patent
Guerinet et al.

(10) Patent No.: US 6,189,287 B1
(45) Date of Patent: Feb. 20, 2001

(54) METHOD FOR PRODUCING A FLOOR, AND RESULTING FLOOR

(75) Inventors: Jean-Paul Guerinet, Compiegne; François Segretain, Bains/Ouste, both of (FR)

(73) Assignee: Lafarge Materiaux de Specialites S.A., Montrouge (FR)

( * ) Notice: Under 35 U.S.C. 154(b), the term of this patent shall be extended for 0 days.

(21) Appl. No.: 09/242,016
(22) PCT Filed: Jul. 31, 1997
(86) PCT No.: PCT/FR97/01437
  § 371 Date: May 20, 1999
  § 102(e) Date: May 20, 1999
(87) PCT Pub. No.: WO98/05603
  PCT Pub. Date: Feb. 12, 1998

(30) Foreign Application Priority Data

Aug. 5, 1996 (FR) .................................................. 96 10029

(51) Int. Cl.⁷ .................................................. E04G 21/00
(52) U.S. Cl. .................. 52/741.1; 52/745.19; 52/742.14; 52/414
(58) Field of Search ................................. 52/414, 742.14, 52/741.1, 745.19; 106/713, 719

(56) References Cited

U.S. PATENT DOCUMENTS

| | | | | |
|---|---|---|---|---|
| 4,362,679 | * | 12/1982 | Malinowski | 264/82 |
| 5,286,425 | * | 2/1994 | Babcock et al. | 264/31 |
| 5,641,815 | * | 6/1997 | Fehlmann | 521/154 |
| 5,737,896 | * | 4/1998 | Rodgers | 52/745.2 |
| 5,873,936 | * | 2/1999 | Ogden | 428/70 |

FOREIGN PATENT DOCUMENTS

| | | |
|---|---|---|
| 3625055 | 1/1988 | (DE) . |
| 4429785 | 1/1996 | (DE) . |
| 2704853 | 11/1994 | (FR) . |

OTHER PUBLICATIONS

Derwent Publications Ltd., Week 9527, AN95–204541, XP002030282 & JP07119262, K. Miyai.
Derwent Publications Ltd., Week 8845, AN88–314772, XP002030283 & AU8813186, Regonia Pty Ttd.
Chemical Abstracts, vol. 110, No. 20, May 15, 1989, Abstract No. 178504v, T. Shinohara et al., p. 338, XP000019556 & JP63210084.
DE3625022–Englidh Abstract
DE4429785–English Abstract
FR2704853–English Abstract

* cited by examiner

Primary Examiner—Christopher T. Kent
Assistant Examiner—Jennifer I. Thissell
(74) Attorney, Agent, or Firm—Millen, White, Zelano & Branigan, P.C.

(57) ABSTRACT

A method for producing a floor by casting a concrete slab with a concrete composition having a water/cement ratio of 0.4–0.7 and a minimum compressive strength no lower than 10 MPa, and depositing a first covering layer on the freshly cast concrete slab as soon as the slab is capable of bearing the weight of a man walking thereon without being damaged, or once the compressive strength of the slab concrete has reached a value of 0.15–0.4 kg/cm². Said covering layer is based on a self-levelling composition. The method is useful for producing all kinds of floors for indoor, outdoor, industrial or commercial use.

28 Claims, No Drawings

METHOD FOR PRODUCING A FLOOR, AND RESULTING FLOOR

This invention relates to a process for the production of a floor and more particularly the floor of a building.

This invention also relates to the floor, and more particularly a building floor, that is obtained according to the production process. The process for the production of a floor applies to any type of floor, for indoor or outdoor use.

A building floor is an indoor floor that is located inside a variety of different types of premises: industrial, agricultural, commercial, laboratories, hospitals, schools, garages, public places, etc. . . .

A floor consists of at least three parts:
a first part, hereinafter called the form, which can be a floor that is prepared according to the rules of the art, or any older concrete that it is desired to renovate;
a second part with a support hereinafter called a concrete slab; and
a third part that is formed by at least one upper covering layer that is integral with the concrete slab.

These floors are to have considerable surface evenness and are to be almost free of random fissuring, cracking, etc. They should have as few joints as possible. Some of these floors are to withstand significant mechanical stresses, such as resistance to the running of conveyors, resistance to perforation under the action of heavy loads, compression strength, flexural/tensile strength, resistance to shocks in the event of heavy objects falling, and resistance to temperature variations. They are to have a long service life.

Floors are also to offer qualities of comfort, aesthetics, and ease of maintenance and repair.

In the case of floors that are to be renovated, it is necessary to limit the restoration work time and consequently business shutdown time. Actually, economic constraints require that the amounts of time during which the surfaces of a building are unusable as a job site be as short as possible.

In the case of new floors, the need to make a floor very quickly for a building under construction is increasingly felt. Economic constraints require that the building be put into service as quickly as possible.

1. Prior Art

The rules of BAEL (Béton Armé à l'Etat Limite [Limited State Reinforced Concrete]) of March 1992 teach that the contractual period for the hardening of a concrete slab is to be 28 days. This allows hardening of the concrete, which then attains enough mechanical resistance to allow the floors and buildings to be put into service.

Unified Technical Document DTU 26.2, requirement 1794, of September 1982, entitled "Chapes et dalles à base de liants hydrauliques [Hydraulic Binder-Based Screeds and Slabs]" teaches that the detachable adhesive screeds are cement mortar works that are executed only after the support concrete has begun hardening at the earliest. These cement mortar screeds are trued up with a ruler, rough-cast, and optionally smoothed according to the desired surface condition.

The major drawback of the process for the production of the floors with these detachable screeds is the length of time required for production. After the concrete support is cast, the worker waits until hardening begins. Actually, it seems that, in practice, the minimum waiting period that is usually observed before doing anything else to the freshly poured concrete slab is longer than the waiting period until the concrete can withstand light mechanical stresses. The technical bias is that freshly poured concrete is too new to undergo the slightest mechanical stress and therefore to put into place one or more additional layers or to be put quickly into service.

In addition, after the screed is put into place, two to three surfacing operations, which take time, are still necessary.

2. Disclosure of the Invention

The object is to develop a very rapid process for the production of a multilayer building floor.

According to the invention, a process for the production of a building floor is characterized in that the following successive stages are carried out:
a) pouring of a concrete slab, of which
the composition of the concrete has an E/C ratio of between 0.4 and 0.7, and of which
once hardened at 28 days, the concrete attains a minimum compression strength that is greater than or equal to 10 MPa;
b) deposition of a first covering layer on the freshly poured concrete slab as soon as said slab can support the weight of a man walking thereon without being damaged, whereby said covering layer has a base of a self-smoothing or self-leveling composition.

According to a second aspect of the invention, a process for the production of a floor is characterized in that the following successive stages are carried out:
a) pouring of a concrete slab, of which
the composition of the concrete has an E/C ratio of between 0.4 and 0.7, and of which
once hardened at 28 days, the concrete attains a minimum compression strength that is greater than or equal to 10 MPa;
b) deposition of a first covering layer on the freshly poured concrete slab as soon as the concrete slab has reached a pressure resistance value of between 0.15 kg/cm$^2$ and 0.4 kg/cm$^2$, whereby the covering layer has a base of a self-smoothing or self-leveling composition.

Technical bias is overcome by using a quick-setting concrete. The production speed is also increased by inserting at least one covering layer that does not require a surfacing operation.

The expression "freshly poured" means that the concrete is beginning its hardening. The first covering layer that is inserted is applied after a minimum waiting period. One skilled in the art knows that high temperatures reduce the setting time and that, by the same token, the low temperatures of winter lengthen the setting times. The expression "freshly poured" means that between 20 and 25° C., the concrete takes on the order of 3 hours to begin to harden and that, at around +5° C., this period is on the order of 8 hours and can go up to 10 hours. Thus, after this variable period of about 3 hours to about 8 hours, the concrete slab can support the weight of a man.

The expression "without being damaged" means that the individual who produces the floor does not perforate the concrete. While walking, his feet may leave slight tracks on the surface of the concrete slab. The degree of hardening of the concrete is sufficient for the workers to be able to walk on the slab without leaving tracks.

This speed of execution is obtained due to the special compositions of the concrete. More specifically, the concrete is formulated to obtain minimum shrinkage, minimum sweating, and quick setting and initial hardening.

The concrete is characterized in that its E/C ratio is between 0.4 and 0.7 and preferably between 0.45 and 0.55.

The first covering layer is characterized in that it comprises a self-smoothing and self-leveling composition. Advantageously, it comprises in particular a hydraulic binder and an organic binder. This layer may have very significant resistance properties. In the following disclosure, it is called a wear layer.

According to a preferred variant, a second covering layer with an epoxy resin base and a hardening agent, preferably of the polyamidoamine type, are provided.

Advantageously, this product ensures the curing and the impregnation of the wear layer. Too, it is a product that also improves the mechanical resistance of the surface of the wear layer. Advantageously, it is also a finishing and aesthetic product.

DETAILED DESCRIPTION OF THE INVENTION

First, the form is prepared according to the rules that are given in the Annales de L'Institute Technique du Bâtiment et des Travaux Publics [Annals of the Technical Institute of Building and Public Works] No. 482 March–April 1990, Shell Series, 37 Paving Works. Various ways of:

preparing and compacting the foundation, constant over its entire surface, leveling of the foundation, placing a sheet of synthetic material over the foundation are imposed.

A concrete slab is poured onto the form. If the form is of poor quality, i.e., if it lacks cohesion, or if it has a low mechanical resistance, reference is made to the rules of the BAEL (Béton Armé à l'Etat Limite) of March 1992 and to the rules for paving calculation of the ITBTP (Institut technique du Bâtiment et des Travaux Publics). The thickness of the slab and, if necessary, the metal reinforcements that are to be used are specified therein.

In the case of the renovation of an old concrete floor, it is possible either to detach the new concrete slab from the old concrete, for example, with the aid of a plastic film or other synthetic materials, or to make an adhesive slab by preparing the surface, by planing, filing, and then depositing an adhesive primer or quite simply by wetting the old concrete. If the old concrete is fissured, a lattice that is made of metal, glass or another material is placed at right angles to the fissure to keep it from propagating.

The concrete compositions for this quick floor production are studied particularly. The criteria that are considered for concrete slabs are:

quick setting, little shrinkage, optionally reinforced with a reinforcement, depending on the loads that it will support later, optionally drawn into fibers based on the loads that it will support later, 28-day compression strength of greater than 10 MPa, preferably greater than 25 MPa and, even better, on the order of 30 MPa or more, a plasticity of greater than 10 cm, preferably from 15 to 21 cm, values that are measured by the Abrams cone in a standardized test (NF P 18-451) for evaluating the workability of the fresh concrete, minimum sweating, minimum segregation, whereby the aggregate-water-binder mass remains homogeneous.

This is why fluid concrete formulas that have said plasticity are preferably selected. This plasticity also includes the speed with which the concrete slab is poured. The hydraulic binder that is used is preferably a Portland Artificiel [Artificial Portland] cement. The concrete is preferably cement-rich. A minimum of 270 kg of cement per m$^3$ of concrete is used for a slab with a thickness of 10 to 20 cm, and a minimum of 300 kg of cement per m$^3$ of concrete is used for a slab with a thickness of 4 to 10 cm. The amount of cement is at most equal to 450 kg/m$^3$ of concrete. In addition, the amount of water is limited to obtain a quick setting. The water/cement (E/C) ratio is between 0.4 and 0.7. The aggregates have a granulometric curve whose maximum diameter of the aggregates does not exceed one-third of the thickness of the slab that it is desired to obtain. The granulometric curve thus is approximately:

0 to 20 mm for a slab with a thickness of between 10 and 20 cm;

0 to 8 mm for a slab with a thickness of between 4 and 10 mm.

The amount of fines, including the cement, that passes through a 200 μm sieve is between 350 and 500 kg/m$^3$ of concrete. These fines contribute to the fluidity of the concrete and make it possible to reduce the amount of water. In addition to cement, these fines can be glass balls, limestone fillers, silica fillers, siliceous limestone fillers, pouzzolanic fillers, flyash, or mixtures of the latter. Advantageously, additives, including at least one fluidizing agent, are added.

Thus obtained is a concrete that has minimum shrinkage and virtually no sweating. The other components vary from one concrete production site to the next.

After the slab is poured, it is trued out, and the concrete is allowed to set for a limited time. To detect the minimum waiting time, the test of a man of medium build walking cautiously over the slab without his steps leaving significant tracks on said slab is used. There is no penetration of the feet of the individual who walks over the slab. Another test is that of the pressure of the thumb being placed perpendicular to the surface and not penetrating the concrete of the slab. The slab of the floor will then have attained enough strength to support light loads.

At this precise moment, the resistance to pressure is estimated relative to the weight of a man of medium build, which is equivalent to a minimum pressure of 0.15 kg/cm$^2$.

Thus, as of this moment, the work can continue. With the concrete composition that is used, the waiting period is particularly short. The times that are noted are 3 to 8 hours, and even at most 10 hours, depending on temperature and hygrometry.

Before a wear layer is deposited, mechanical surfacing of the surface of the slab is done. This operation is used first to eliminate the chalking that is present on the surface. This operation is then used to ensure the evenness of the surface while eliminating such irregularities as projections and hollows. This operation is used to regularize the pores of the surface. This operation finally is used to obtain a suitable roughness to create better adherence with the covering layer that will then be deposited. Therefore, homogeneity of appearance and structure will be achieved very quickly.

The boundary waiting period is that where it is still possible to carry out the mechanical surfacing operation before the concrete surface hardens completely. At this time, the concrete attains a pressure resistance that is approximately equal to 0.4 kg/cm$^2$. Overall, after 8 hours and up to 10 hours of rest, under fairly adverse climatic conditions according to one skilled in the art, surfacing can no longer be done satisfactorily.

For the wear layer, a composition that has properties of being self-smoothing and self-leveling is selected. Its thickness is between 5 and 30 mm and preferably between 8 and 20 mm, and even more preferably between 8 and 15 mm.

The selection of the composition of the wear layer is made essentially based on the mechanical characteristics that it is desired to obtain. It is mainly to offer performance levels to limit the shrinkage phenomenon, almost perfect adhesion to the underlying concrete slab, and adequate hardness. This is why it is preferred to use compositions that comprise at least one mineral hydraulic binder, advantageously a Portland cement, and at least one organic binder.

The amount of organic binder preferably does not exceed 8% by weight and, in the dry state, the total amount of the other components of the wear screed, and even better, this binder represents at most 5%. This organic binder has the function of imparting a certain flexibility to the wear layer. In addition, it promotes the adhesive bonding of the wear layer to the freshly poured concrete slab. This organic binder also can comprise polymers that additionally provide for fluidification of the wear layer. These polymers are to be compatible with mineral hydraulic binders, and in particular are to be able to coalesce in an alkaline medium. Preferably, a vinyl acetate polymer is selected, and more preferably an ethylene and vinyl acetate copolymer, such as the product that is marketed by the WACKER Company under the name VINNAPAS LL 222.

The aggregates of the wear layer are to exhibit a granulometric curve whose maximum diameter of the aggregates does not exceed one-third of the thickness of the wear layer that it is desired to obtain. This granulometric curve is between 0 and 5 mm, and preferably between 0 and 2 mm.

The compression strength of the wear layer is at least 20 MPa at 28 days. This minimum resistance is adequate to support foot traffic on indoor floors of public places, schools, . . . In contrast, it is possible to make a composition for a wear layer that makes it possible to attain, at 28 days, a compression strength of 50 MPa, up to 70 MPa or more. This resistance is obtained in particular thanks to the use of siliceous sands. Under these conditions, the mechanical properties of the covering prove to be particularly high-performing. This very resistant wear layer is particularly advantageous for industrial floors.

The wear layer hardens quickly because of the exothermy of the concrete slab and its own release of heat.

To control and shape the fissuring that is due to shrinkage, as soon as the floor that is obtained, which comprises a concrete slab and a wear layer, has an adequate consistency, the cutting of the fractionating joints is carried out. This operation is specified by Unified Technical Document (DTU) dated September 1982 (requirement 1794 no. 26.2 "Chapes et dalles à base de liant organique"). The joints are sawed approximately every 25 m$^2$, close to the pillars, inspection holes, doorsteps, projecting angles, etc. In this manner, zones of least resistance are created in the concrete. Thus, the concrete can preferably be fissured in a clean and straight way in these fractionating joints.

Once the cutting of the joints is completed, another covering layer, in particular a finishing layer that acts as a curing product, can be applied. Any curing product can be suitable, with the proviso that this product be compatible with the water that is present in the wear layer and be compatible with the alkaline medium of the wear layer. In other words, it is to exhibit a physical and chemical affinity with the cement and with the aqueous phase. A product with an epoxy resin base is advantageously used. Also preferably, the hardening agent is of the polyamidoamine (or polyamide) type. Once spread, this product makes it possible to obtain a porosity that is specially studied to make it possible to limit the evaporation of water from the wear layer, the water from the underlying concrete slab. This product offers performance levels that make it possible to minimize the fissuring. Actually, if the evaporation is too fast, incipient fissuring appears. One skilled in the art knows from experience that, in the case of mortars, excessively fast evaporation of the water reduces the cohesion of the layer. This product has a viscosity range that is studied to impregnate and to penetrate the wear layer correctly. To do so, its viscosity is advantageously less than 3 MPa.s. Thus, the impregnation of the wear layer can be on the order of 1 mm. This imparts to the second covering layer its resistance to detachment. This product increases the hardness of the surface, in particular its resistance to scratching, because after application and drying, a perfectly smooth and hard surface is obtained. This product clogs the pores that are present at the surface of the wear layer. This last property makes it possible to keep floors very clean and to facilitate cleaning without dust build-up. Finally, this product enhances surface aesthetics, and the floor that is obtained shines. It is possible to color it with any of the desired tints.

Advantageously, the epoxy resin is liquid and has a bisphenol-A base. Its mean molecular weight is 300 to 500 g/mol. In the epoxy resin, a reactive diluent that participates in the crosslinking reaction is preferably provided. The solvent can consist of one or more polar solvents that are used to produce an affinity with the water of the wear layer. The solvents preferably have a base of glycol ethers to which aromatic and ketonic solvents in particular can be added. It would optionally be possible to use an aqueous-phase epoxy resin. The hardening agent is preferably of the polyamidoamine type; it is nevertheless possible to use a polyamine type hardening agent. The ratio of the amount of hardening agent to the amount of resin is based on the desired characteristics for the covering layer and in particular on the type of said chemical resistances. The installation temperature of the covering layer is to be greater than +8° C., for otherwise the resin does not polymerize.

Owing to the process according to the invention, a considerable increase in the production speed of new or renovated floors of up to 500 m$^2$ per day is obtained to produce the floor with a slab and two covering layers, to which it is necessary to add a period of 4 to 8 days until it is put back into service. With the standard techniques, this comes out to 500 m$^2$ in 28 days to obtain the concrete slab, to which 15 days has to be added to obtain the slab and the wear layer, and to which is also added 8 days to obtain the floor with a slab, the wear layer and the second covering layer, until it is put back into service.

It is also possible to renovate old floors. It is necessary to prepare the surface of the old concrete, then to pour a concrete layer whose thickness will depend on the level of the floor that the user desires, generally between 4 and 10 cm, and finally to deposit the wear layer and, if necessary, the finishing layer of the type of those described above.

Embodiments

EXAMPLE 1

Production of a New Building Floor

The form bottom is to be made by the worker with good materials and is to be adequately compacted. A check of the hardness is made, tests with the Westergaard modular plate: K>4. If K<4, the slab is reinforced. A check is also made of the planimetry with a laser level where the planimetry tolerance is ±1 cm.

A polyane film with a minimum thickness of 150 μm is installed. Said film makes it possible to keep water from rising by capillary action. The covering of the widths is 50 cm. The outer and recovery molds are installed.

Then, a concrete that is classified as B25 is poured, and for 1 m$^3$ said concrete comprises particularly:

880 kg of 0/3 sand, 167 kg of 6/10 mm gravel,
460 kg of 10/14 mm gravel,
330 kg of 14/20 mm gravel,
330 kg of CPA, CEM1 52.5 according to standard NF P15-301 of 1994,
40 kg of fillers,
170 l of mortar-mixing water,
1% by weight of superplasticizing cement, trade name Superplast CB 30 from the Chyrso Company, certified NF according to standard NF P 1833.

The E/C ratio is approximately equal to 0.5. The amount of fines that pass at 200 μm is 460 kg per m³. These fillers can be limestone.

After the concrete slab with a thickness of 15 cm has been poured, it is regularly tested for hardness with the aid of a thumb. As soon as the thumb no longer penetrates or after approximately 4 hours of rest, the slab can support a man's weight.

The surfacing (or floating) operation is then carried out in one pass mechanically with a device called a helicopter.

Then, a covering layer with a thickness of 1 cm is deposited. It is intended to form the resistant wear layer.

For deposition, the automatic pump that is known by the trade name SERVAPLAN is used. According to the invention, the composition from which the wear layer is made is self-leveling and self-smoothing. The compression strength of the hardened wear layer is 46 MPa at 28 days. It goes by the trade name PM2 from the OMNIPLASTIC Company and basically comprises:
18 to 25% of Portland cement,
1 to 10% of aluminous cement,
5 to 25% of fillers,
35 to 65% of siliceous sands,
0.5 to 5% of organic binder, with an ethylene and vinyl acetate copolymer base, i.e., the powder VINNAPAS LL 222 that is marketed by WACKER CHIMIE,
0.05 to 1% of liquefier, with a polyalkylene glycol base,
0.01 to 0.3% of a setting regulator.

Other components such as dyes, hardening agents, and retardants can be added to this formulation to enhance the characteristics and the performance of the layer.

This covering is allowed to dry for about 2 hours.

Then, the mechanical sawing of the joints is done.

As far as the layer with an epoxy resin base is concerned, it uses a composition with a liquid epoxy resin base that goes by the commercial name Eurepox 784 and a hardening agent of the polyamidoamine type with the commercial name Euredur 460 from the Schering Company. The resin plus hardening agent mixture is produced in situ. To do so, 3 volumes of resin are mixed per 1 volume of hardening agent. Then, this finishing layer is spread with a roller. An amount of 180 to 200 g/m², which represents a final finishing thickness of 100 μm, is used.

It is possible to carry out the installation of the three layers in a single day over large surfaces.

Four days after the installation of this last layer, the new building floor can be put into service without any additional waiting period.

EXAMPLE 2

Rehabilitation of an Old Floor

The entire surface of the old concrete is planed and then vacuumed to remove any nonadhesive parts and to make the surface uniform.

An adhesive or bonding primer is then distributed in a layer. 200 g/m² is used. This primer consists of an aqueous dispersion of vinyl copolymers. It is allowed to dry for 2 hours.

A concrete layer with a thickness of 5 cm is poured. The granulometric curve of this concrete is 0 to 8 mm, taking into account the small thickness. In addition, fibers are added to improve flexural strength.

Then, the surfacing operation is carried out in a single pass mechanically with a device that is called a helicopter.

A covering layer with a thickness of 1 cm is then applied. It is intended to form the wear layer. It is the composition that is described in Example 1 above. Its compression strength is 46 MPa at 28 days.

This covering is allowed to dry for about 2 hours.

Mechanical sawing of the joints is then carried out.

Then, the epoxy-polyamide finishing layer of the same type as in 1) is spread with a roller.

Four days after this last layer has been installed, the renovated building floor can be put back into service without additional waiting.

In Examples 1) and 2), wear layer PM2 with the hardened epoxy covering layer has the following properties:
density of the dry product 2±0.1;
compression strength at 7 days, 34 MPa and at 28 days, 46 MPa;
flexural strength at 7 days, 10 MPa, and at 28 days, 14 MPa;
surface hardness determined with the Zwick device at 7 days, 11 kg/mm², and at 28 days, 15 kg/mm²;
dynamic elasticity at 7 days 22000 MPa, and at 28 days 23000 MPa;
perforation resistance>8 kg/mm²;
shock resistance, no degradation with balls of 250 g and 500 g;
cutting shock resistance, no degradation in the perfo test;
resistance to abrasion with a loaded steel wheel;
adhesion to old concrete in Example 2) at 7 days, 2.5 Mpa, and at 28 days, 3.1 MPa;
resistance to chemical attack by sulfuric, hydrochloric, nitric, acetic, and citric acids at permanent pH 5 and occasional pH 4, and with basic cleaning agents, calcium chloride;
resistance to various stains, red wine, oil, . . .

It is also possible to improve the resistance properties of the floors, for example chemical resistance to acid attack, with an additional layer of, for example, polyurethane, in particular in the case of floors that are intended for the farm produce industry.

The process of production, the concrete compositions, the covering layer, and the floor according to the invention are not limited by the details of the embodiments and the examples that are selected to illustrate it. Modifications of compositions and of characteristics can be supplied without thereby exceeding the scope of the invention.

What is claimed is:

1. A process for the production of a floor, comprising conducting the following successive stages:
   a) pouring of a concrete slab, of which
      the composition of the concrete has an E/C ratio of between 0.4 and 0.7, and of which
      once hardened, the concrete attains a minimum compression strength that is greater than or equal to 10 MPa;
   b) deposition of a water and alkaline containing first covering layer on the freshly poured concrete slab as soon as said slab can support the weight of a man walking thereon without being damaged, said first covering layer having a base of a self-smoothing or self-leveling composition comprising at least one organic binder and at least one hydraulic binder;

c) deposition of a finishing layer on the first covering layer, the finishing layer acting as a curing product, the finishing layer having a base of a composition compatible with the water present in the first coveying layer and compatible with the alkaline medium of the first covering layer.

2. A process according to claim 1, wherein the E/C ratio of the concrete of the slab is between 0.45 and 0.55.

3. A process according to claim 1, wherein, once hardened, the concrete attains a compression strength that is greater than 25 MPa.

4. A process according to claim 2, wherein, once hardened, the concrete attains a compression strength that is greater than 30 MPa.

5. A process according to claim 1, wherein the composition of the concrete comprises a minimum amount of cement of 270 kg of cement per m$^3$ of concrete, for a slab of 10 to 20 cm of maximum thickness or a minimum amount of 300 kg of cement per m$^3$ of concrete, for a slab of 4 to less than 10 cm of thickness.

6. A process according to claim 4, wherein the amount of cement in the composition of the concrete is at most equal to 450 kg/m$^3$ of concrete.

7. A process according to claim 1, wherein the plasticity of the composition of the concrete is greater than 10 cm, measured using the Abrams cone according to French standard NF P 18-451.

8. A process according to claim 1, wherein in the composition of the concrete of the slab, the aggregates exhibit a granulometric curve:
    from 0 to 20 mm for a slab with a thickness of 10 to 20 cm;
    from 0 to 8 mm for a slab with a thickness of 4 to less than 10 cm.

9. A process according to claim 1, wherein the composition of the concrete of the slab has an amount of fines that pass through a 200 $\mu$m sieve of between 350 and 550 kg/m$^3$ of concrete.

10. A process according to claim 8, wherein in addition to the cement, the fines are glass balls, limestone or silica fillers, or siliceous limestone or pouzzolanic fillers, flyash or mixtures of the latter.

11. A process according to claim 1, wherein the composition of the concrete of the slab comprises at least one fluidizing agent.

12. A process according to claim 1, wherein the concrete comprises a reinforcement or wherein the composition of the concrete of the slab comprises fibers.

13. A process according to claim 1, wherein the first covering layer is produced with a composition that makes it possible to attain, once hardened, a minimum compression strength on the order of 20 MPa.

14. A process according to claim 1, wherein the first covering layer has a thickness that is greater than or equal to 5 mm and less than 30 mm.

15. A process according to claim 1, wherein a surfacing operation of the concrete slab is carried out before the first covering layer is deposited to eliminate unevenness and to make the surface uniform.

16. A process according to claim 1, wherein the composition of the finishing layer layer comprises an epoxy resin and a polyamidoamine type hardening agent.

17. A process according to claim 16, wherein the composition of the finishing layer comprises one or more polar solvents.

18. A process according to claim 7, wherein the plasticity of the composition of the concrete is from 15 to 21 cm, measured using the Abrams cone according to French standard NF P 18-451.

19. A process according to claim 1, wherein the deposition of a first covering layer on the freshly poured concrete slab is made at the beginning of the hardening of the concrete, when the concrete has reached a minimum value of pressure resistance of 0.15 kg/cm$^2$.

20. A floor as produced by the process of claim 1.

21. A process for the production of a floor, comprising conducting the following successive stages:
   a) pouring of a concrete slab, of which
      the composition of the concrete has an E/C ratio of between 0.4 and 0.7, and of which
      once hardened, the concrete attains a minimum compression strength that is greater than or equal to 10 MPa;
   b) deposition of a water and alkaline containing first covering layer on the freshly poured concrete slab as soon as the concrete of the slab has reached a pressure resistance value of between 0.15 kg/cm$^2$ and 0.4 kg/cm$^2$, said first covering layer having a base with a self-smoothing and self-leveling composition comprising at least one organic hinder and at least one hydraulic binder;
   c) deposition of a finishing layer on the first covering layer, the finishing layer acting as a curing product, the finishing layer having a base of a composition compatible with the water present in the first covering layer and compatible with the alkaline medium of the first covering layer.

22. A process according to claim 21, wherein the first covering layer is produced with a composition whose aggregates have a granulometric curve of between 0 and 5 mm.

23. A process according to claim 22, wherein the aggregates of the first covering layer comprise siliceous sands.

24. A process according to claims 21, wherein the organic binder has a vinyl acetate polymer base.

25. A process according to claim 22, wherein the first covering layer is produced with a composition whose aggregates have a granulometric curve of between 0 and 2 mm.

26. A process according to claim 24, wherein the organic binder has a base of a copolymer of ethylene and vinyl acetate.

27. A floor as produced by the process of claim 21.

28. A process for the production of a floor, comprising conducting the following successive stages:
   a) pouring of a concrete slab, of which
      the composition of the concrete has an E/C ratio of between 0.4 and 0.7, and of which
      once hardened, the concrete attains a minimum compression strength that is greater than or equal to 10 MPa;
   b) deposition of a water and alkaline containing first covering layer on the freshly poured concrete slab as soon as said slab can support the weight of a man walking thereon without being damaged, said first covering layer having a base of a self-smoothing or self-leveling composition comprising at least one organic binder and at least one hydraulic binder.

* * * * *

UNITED STATES PATENT AND TRADEMARK OFFICE
CERTIFICATE OF CORRECTION

PATENT NO.      : 6,189,287 B1
DATED           : February 20, 2001
INVENTOR(S)     : Jean-Paul Guerinet et al.

It is certified that error appears in the above-identified patent and that said Letters Patent is hereby corrected as shown below:

<u>Claim 16,</u>
Line 2, delete "layer".

Signed and Sealed this

Second Day of April, 2002

Attest:

Attesting Officer

JAMES E. ROGAN
*Director of the United States Patent and Trademark Office*